(12) United States Patent
Bentley et al.

(10) Patent No.: US 7,240,319 B2
(45) Date of Patent: Jul. 3, 2007

(54) APPARATUS, SYSTEM, METHOD, AND PROGRAM FOR FACILITATING THE DESIGN OF BARE CIRCUIT BOARDS

(75) Inventors: Stanley Loren Bentley, Indianapolis, IN (US); Charles Mark Henthorn, Indianapolis, IN (US); Elaine Marie Heazeltine, Indianapolis, IN (US); Ricky Lee Thacker, Martinsville, IN (US)

(73) Assignee: Diversified Systems, Inc., Indianapolis, IN (US)

( * ) Notice: Subject to any disclaimer, the term of this patent is extended or adjusted under 35 U.S.C. 154(b) by 294 days.

(21) Appl. No.: 10/780,990

(22) Filed: Feb. 18, 2004

(65) Prior Publication Data

US 2004/0199891 A1 Oct. 7, 2004

Related U.S. Application Data

(60) Provisional application No. 60/448,324, filed on Feb. 19, 2003.

(51) Int. Cl.
*G06F 17/50* (2006.01)

(52) U.S. Cl. .............. 716/11; 716/15; 716/1; 700/121

(58) Field of Classification Search ........... 716/11, 716/15, 1; 700/97, 121
See application file for complete search history.

(56) References Cited

U.S. PATENT DOCUMENTS

| | | | | |
|---|---|---|---|---|
| 5,455,948 A * | 10/1995 | Poole et al. | ........ | 707/102 |
| RE36,602 E | 3/2000 | Sebastian et al. | ........ | 700/97 |
| 6,496,957 B1 * | 12/2002 | Kumagai | ........ | 716/4 |
| 6,560,770 B1 * | 5/2003 | Saxena et al. | ........ | 717/107 |
| 6,625,511 B1 * | 9/2003 | Suzuki et al. | ........ | 700/110 |
| 6,629,008 B2 | 9/2003 | Shiiba et al. | ........ | 700/100 |
| 6,634,008 B1 | 10/2003 | Dole | ........ | 716/1 |
| 6,678,877 B1 | 1/2004 | Perry et al. | ........ | 716/15 |
| 6,832,122 B1 | 12/2004 | Huber | ........ | 700/95 |
| 6,983,232 B2 | 1/2006 | Nguyen et al. | ........ | 703/7 |
| 6,996,599 B1 | 2/2006 | Anders et al. | ........ | 709/201 |
| 2002/0072956 A1 * | 6/2002 | Willems et al. | ........ | 705/10 |
| 2002/0078145 A1 | 6/2002 | Beran | ........ | 709/203 |
| 2003/0046337 A1 | 3/2003 | Strahm et al. | ........ | 709/203 |
| 2003/0140097 A1 | 7/2003 | Schloer | ........ | 709/203 |
| 2003/0163214 A1 | 8/2003 | Ouchi | ........ | 700/97 |
| 2003/0167453 A1 | 9/2003 | Smith | ........ | 716/15 |
| 2003/0178388 A1 * | 9/2003 | Phillips | ........ | 216/13 |
| 2003/0191799 A1 | 10/2003 | Araujo et al. | ........ | 709/203 |
| 2004/0208354 A1 | 10/2004 | Vilella | ........ | 382/145 |
| 2004/0210330 A1 | 10/2004 | Birkle | ........ | 700/96 |
| 2004/0268299 A1 * | 12/2004 | Lei et al. | ........ | 717/106 |

OTHER PUBLICATIONS

"New Models to Speed the Development of Electronics Components", Mar. 1999, PREAMP Consortium (Joint Venture), Paper on Manufacturing, 3 pages.*
"CALS Technical Goal 2", 1997, Swedish Defense Material Administration, pp. 1-239.*

* cited by examiner

*Primary Examiner*—Sun James Lin
(74) *Attorney, Agent, or Firm*—Barnes & Thornburg LLP

(57) ABSTRACT

An apparatus, system, method, and program for facilitating the design of a bare board circuit board include transmitting a user interface application to a user over a publicly-accessible global network. The user interface application is updated in response to circuit board design data entered by the user.

29 Claims, 15 Drawing Sheets

APPARATUS, SYSTEM, METHOD, AND PROGRAM FOR FACILITATING THE DESIGN OF BARE CIRCUIT BOARDS

This application claims priority under 35 U.S.C. § 119(e) to U.S. Provisional Application Ser. No. 60/448,324, filed on Feb. 19, 2003, the entirety of which is hereby incorporated by reference herein.

CROSS REFERENCE

Cross reference is made to copending U.S. patent application Ser. No. 10/781,249 entitled "Apparatus, System, Method and Program for Facilitating the Design of Electronic Assemblies" by S. Bentley, et al. which is assigned to the same assignee as the present application, is filed concurrently herewith, and is hereby incorporated by reference.

FIELD OF THE DISCLOSURE

The present disclosure relates generally to a network-based system, and more particularly to a network-based system for facilitating the design of a bare circuit board.

BACKGROUND OF THE DISCLOSURE

An electronic assembly typically includes a printed circuit board. The printed circuit board is populated with the various components associated with the assembly. The printed circuit board includes a relatively large number of signal carrying lines in the form of metallic traces which electrically couple two or more portions of circuit board to one another. Circuit boards may take the form of single-sided boards, double-sided boards, or multilayered boards which have a number of inner layers.

The layout and design of printed circuit boards can be a relatively complex task. Indeed, designers are often faced with problems such as insufficient board "real estate," conflicts with design standards, product cost constraints, etcetera. For example, during the layout and design of a circuit board, the designer may run out of room for the parts to be mounted on the topside board, yet the designer does not have all of the parts placed on the topside of the board. Moreover, the current design guidelines under which the designer is operating may state that, for example, surface mounted chips are not to be placed on the bottom side of the board. Hence, the designer is faced with the choice of either (1) putting surface mounted chips on the bottom side thereby violating the design guidelines in addition to increasing the cost of the assembly, (2) increasing the size of the board thereby increasing its cost, or (3) increasing the "technology level" of the board with more layers, finer lines, smaller pitch components, etcetera thereby also increasing the cost of the assembly.

In light of the fact that each of the above-identified options increases the cost of the assembly, the designer must determine which of the options will yield the most cost effective solution to the problem. In other words, the designer is challenged with finding the solution to his or her problem that increases the cost of the assembly by the least amount. In reality, of course, there is no universal solution to such a problem. Each situation is generally unique. In practice, the typical way to explore the designer's options is to have a circuit board vendor and an assembler quote each different option and then compare them. Unfortunately, getting these vendors to allow access to quoting resources with no prospect for an order is often difficult. There is no way the designer can do this for herself or himself.

Hence, the designer often takes her or his "best guess" at a solution to the design dilemma. The design is then presented to a supply base of vendors to determine the cost of the product based on the design. Often the "real" cost of the product based on the design exceeds the marketing expectations resulting in costly redesign efforts to reduce the cost.

SUMMARY OF THE DISCLOSURE

According to one illustrative embodiment, there is provided a system for facilitating the design of printed circuit boards. When a user (e.g., a board designer) logs onto the system, she or he may enter design information about a circuit board and monitor the running cost of the board as the designer modifies the parameters of the design. As such, the designer may evaluate design decisions in "real time," while also obtaining an estimate of the production cost of a new design.

Such a system may be implemented on a network. The network may be a global, publicly-accessible network such as the Internet. Access to the system may be password protected.

Such a system may use costing information derived from the manufacturer of the circuit board to produce the running cost which is displayed to the designer. Such a system may also compare the design parameters input by the designer to the manufacturer's process capabilities to monitor the manufacturability of the design.

The above and other features of the present disclosure will become apparent from the following description and the attached drawings.

BRIEF DESCRIPTION OF THE DRAWINGS

FIGS. 4–15 are screen displays of a user interface application which is displayed to a user on a display monitor during performance of the routine of FIG. 2.

DETAILED DESCRIPTION OF AN ILLUSTRATIVE EMBODIMENT

Figure 1:
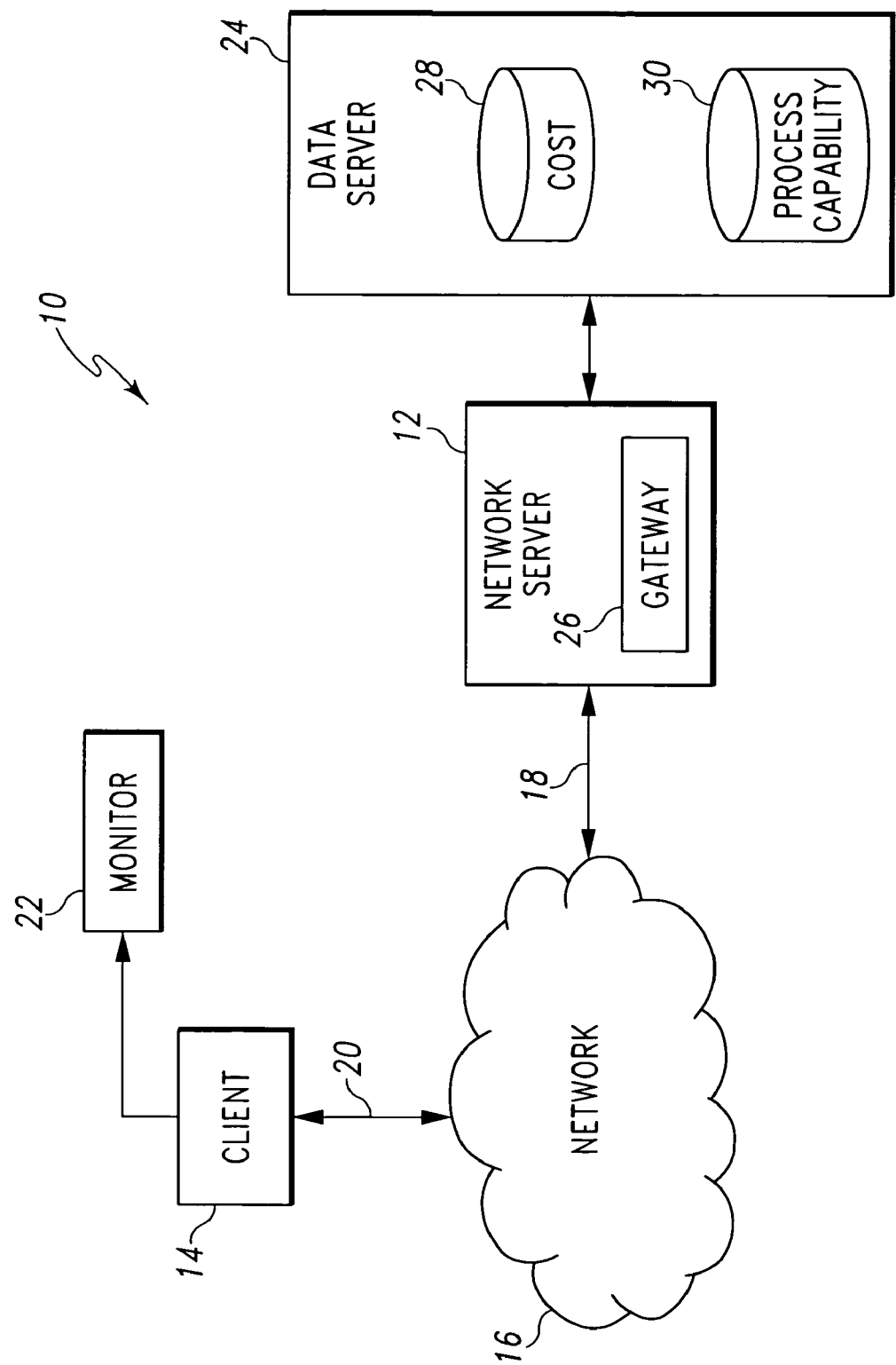
FIG. 1 is a simplified block diagram of a network-based system which incorporates the features of the present disclosure therein.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

The present disclosure is directed to an apparatus, method, system, and program for facilitating the design of bare circuit boards. In essence, the concepts disclosed herein allow a user such as a designer to compare a number of different design options prior to committing the design to final form. In such a way, comparisons between different design alternatives can be made upfront by the designer thereby reducing costs and cycle times. In the exemplary embodiment described herein, the "user" is described as a board designer, or simply "designer." However, it should be appreciated that a designer is but one example of a user and such a description is not intended to limit the scope of the disclosure to one particular type of user, but rather on the contrary, the concepts disclosed herein may be used by any type of user.

As shown in FIGS. 3–15, a number of data entry screens are presented to a designer via an interface device such as a display monitor of a personal computer (PC). The designer may navigate throughout the screens and enter relevant information pertaining to one or more circuit board designs by operating an input device such as the PC's mouse or keyboard. In response to this input, cost data associated with the various parameters of the circuit board design is retrieved from a cost database, assembled into a cost estimate, and displayed to the designer. Moreover, the design parameters input by the designer are also compared to a set of rules relating to manufacturing process capabilities stored in a process capability database to determine if any of the design parameters input by the designer are approaching or exceeding the vendor's capabilities. For example, if the designer enters a tolerance requirement for a via hole that exceeds the board manufacturer's drilling capability, a message indicating such a conflict is generated and displayed to the designer.

In such a way, a designer can enter a number of "what if" scenarios and monitor the impact that each scenario has on the cost of the board. Moreover, the designer can also determine if any of such scenarios are outside of the capabilities of the board manufacturer. As such, the restrictions associated with a designer's need to commit to a design without knowing the cost and manufacturability ramifications for doing so are eliminated.

To do so, in regard to one illustrative embodiment, as shown in FIG. 1, a network-based system 10 has a network server machine 12 which communicates with a client machine 14 via a network 16. A data server 24 is coupled to the network server 12. Typically, the network server 12 and the data server 24 are operated and/or maintained by a circuit board manufacturer, whereas the client machine 12 is under the control of the designer. Although only one network server 12, one client 14, and one data server 24 are shown in FIG. 1, it should be appreciated that the system may include any number of network servers 12, clients 14, or data servers 24.

In a conventional manner, each of the network servers 12, the clients 14, and the data servers 24 includes a number of components commonly associated with such machines. For example, although not shown in detail in the drawings, each of the network servers 12, the clients 14, and the data servers 24 may include, amongst other things customarily included in such machines, a central processing unit ("CPU"), a non-volatile memory such as a read only memory ("ROM"), a volatile memory such as a random access memory ("RAM"), and one or more data storage devices. It should also be appreciated that such components may be integrated into a single housing or may be provided as a number of separate, discrete devices. It should also be realized that the network server 12, the client 14, and the data server 24 may be operated with known, commercially available software operating systems.

As such, the network server 12 may be embodied as any type of commercially available network server. The storage devices associated with the network server 12 maintain a number of databases and files which are utilized in the construction and operation of an information portal such as a website. As will be described in greater detail below, the network server 12 also functions as a gateway 26 for exchanging information across networks that are incompatible and that use different protocols. The gateway 26 may be embodied as any combination of commercially available hardware and/or software that connects different types of networks such that information can be exchanged therebetween.

Similarly, the data server 24 may be embodied as any type of commercially available data server. The storage devices associated with the data server 24 maintain a number of databases and files which are utilized in the construction and operation of the system. In particular, as will be described in greater detail herein, the data server 24 maintains one or more cost databases 28 which include cost data associated with a circuit board fabrication process. The data server 24 also maintains one or more process capability databases 30 which include capability data associated with the circuit board fabrication process. Such capability data may be in the form of rule sets which require product dimensions and/or the tolerances associated therewith to be within prescribed ranges. It should be appreciated that although described herein as being separate databases, the cost database 28 and the process capability database 30 may be integrated into a single database, if desired. In addition, the databases 28, 30 may be "hard coded" in a user interface application thereby forming a single application download.

It should be appreciated that although shown in FIG. 1 as being discrete components, a common component may be used as both the network server 12 and the data server 24. In particular, the functionality of both devices may be executed by a single machine utilizing the appropriate network and data storage software and hardware.

The client 14 preferably includes an output device such as a display monitor 22 for displaying a number of images to the designer. As such, the client 14 may be embodied as any type of commercially available computing device such as a personal computer ("PC"). Moreover, the client 14 may also be embodied as a "mobile" device such as a cellular phone, a mobile data terminal, a portable computer, a personal digital assistant ("PDA"), or some other device of similar kind.

As shown in FIG. 1, the network server 12 is coupled to the network 16 via a communication link 18, whereas the client 14 is coupled to the network 16 via a communication link 20. It should be appreciated that the each of the communication links 18, 20 may be provided as any number or type of data link including both wired and wireless data links. Moreover, it should also be appreciated that one or more intervening modems (not shown), data routers (not shown), and/or internet service providers ("ISPs") (not shown) may be used to transfer the data between the network server 12, the client 14, and the network 16.

The network 16 of the present disclosure may be embodied as any type of network such as a LAN or WAN. Moreover, in a specific illustrative embodiment, the network 16 is embodied as a publicly-accessible global network such as the internet.

A designer may utilize the client 14 to access information stored on the network server 12 (or on a device associated with the server 12). In the case of an internet-based system (i.e., the network 16 is embodied as the internet), the server 12 is embodied as a web server and, as such, hosts a website which may be accessed by the designer from the client 14. In such cases, access to the website may be password protected thereby restricting access to website to those designers registered with the host (i.e., the board manufacturer hosting the website). In any event, once a designer accesses the website, a user interface application is downloaded from the server machine 12 to the client machine 14 via the network 16 for display to the designer on the display monitor 22. In one specific embodiment, the databases 28, 30 are "hard coded" in the user interface application and are downloaded from the server machine 12 to the client machine 14 contemporaneously with the user interface application.

The designer may then peruse the contents of the user interface application and enter information relating to a circuit board design. In particular, the designer may navigate around the user application and enter information relating to a circuit board design such as, for example, the physical dimensions of the board, the number of layers contained in the board, the quantity of boards needed, the turnaround time required to produce the board, the material type of the board, the number of holes, the number of different hole sizes, the dimensions of the printed features of the board (e.g., annular rings, SMT pads, etcetera), the size of the lines and spaces, and so on. The designer may input such information by use of the client machine's input devices (e.g., the mouse and keyboard).

In response to the user-supplied circuit board design information, the client 14 may query the cost databases 28 or other data repositories downloaded from the server 12 and stored on the client 14 and retrieve cost data associated with the designer's input. Moreover, the client 14 may also query the process capability database 30 or other data repositories to determine if the data input by the designer is indicative of a design requirement that either approaches or even exceeds the process capabilities of the circuit board manufacturer. Once the client 14 has retrieved the appropriate information from the databases 28, 30, the client 14 the utilizes the information to display to the designer a number of images (both text and graphical) in the form of an updated user interface which includes both the cost data and manufacturability data associated with the board design.

In embodiments in which the databases 28 and 30 are stored on a remote data server 24 (i.e., versions of the databases 28, 30 are not hard coded into the user interface application or otherwise downloaded to the client 14), the client 14 generates an output signal indicative of the user's input in response to input of the user-supplied circuit board design information. The client 14 transmits the output signal to the network server 12 via the network 16. The server 12 then forwards the information to the data server 24 which analyzes the data input by the designer and determines an appropriate response thereto. In particular, the data server 24 may query the cost databases 28 or other data repositories to determine and retrieve cost data associated with the designer's input. Moreover, the server 24 may also query the process capability databases 30 or other data repositories to determine if the data input by the designer is indicative of a design requirement that either approaches or even exceeds the process capabilities of the board manufacturer. Once the appropriate information has been located in the databases 28, 30, data files associated with such information are retrieved from the databases 28, 30 and transmitted to the client 14 via the network 16. The client 14 then utilizes the contents of such files to display to the designer a number of images (both text and graphical) in the form of an updated user interface which includes both the cost data and manufacturability data associated with the board design.

As described, the contents of the databases 28, 30 (both as maintained on the data server 24 and hard coded in the user interface application) are utilized to provide dynamic updates to the designer based on the design specifications being entered by the designer. To do so, the databases 28, 30 contain costing data associated with the board manufacturer's operation. In particular, a board manufacturer may utilize a costing structure in which the cost per board is calculated as a function of the board's characteristics. Hence, when such characteristics are entered by the designer, the data stored in the cost database 28 may be used to calculate the cost of the board.

For example, the board manufacturer's operation may be divided into a plurality of work centers each of which represents a certain step or phase of the manufacturing process. Data in the form of, for example, fixed or variable multipliers for each cost center are stored in the cost database 28. Hence, when information relating to a particular board design is entered by the designer, the cost per work center may be calculated based on such information. Moreover, the time required in each work center of the board manufacturing process may also be estimated based on the board design. Typically, the longer the processing time, the more expensive the design is to produce. Hence, such timing information may be calculated and converted into cost data and stored in the cost database 28.

The cost database 28 also includes cost data associated with different board technology types as well. For example, cost data associated with material types, layer counts, etcetera are stored in the cost database 28. As a result, for example, should the designer want to know the cost penalty for converting a 4-layer multilayer board design to a 6-layer multilayer board design, the designer simply changes the "layer count" information input from "4" to "6" and watches as the cost figure (and the tooling figure) increases since material cost generally increases as the board design increases in layer count. It should be appreciated that such an increase in layer count will likely also increase the cost in one or more other work centers since the fabrication of boards with such increased layers typically is more complex relative to boards with fewer layers.

The total cost of the board may be calculated by summing the cost of each of the work centers and the material costs. It should be appreciated that the total cost may change with each entry the designer makes (once enough information has been entered to begin a calculation). As such, the designer may receive immediate feedback as to the cost impact of the changes being made to the board design.

It should appreciated that the cost database 28 may be arranged in any format desired to fit the needs of a given system. The format described herein (i.e., a cost amount driven by individual work center costs) is merely exemplary in nature.

The process capability database 30 includes data related to the process capabilities of the board manufacturer. In particular, the database 30 may include a number of rule sets which are used to flag or otherwise identify any violations or near-violations of the board manufacturer's process capabilities. Information associated with any violations or near-violations of the board manufacturer's process capabilities are communicated to the designer. Moreover, certain violations or near-violations of the manufacturer's capabilities may not completely preclude the manufacturer from building the design, but rather may create a yield or cost penalty. In these cases, any such yield or cost penalty is considered in the calculation of the board cost.

Figure 2:
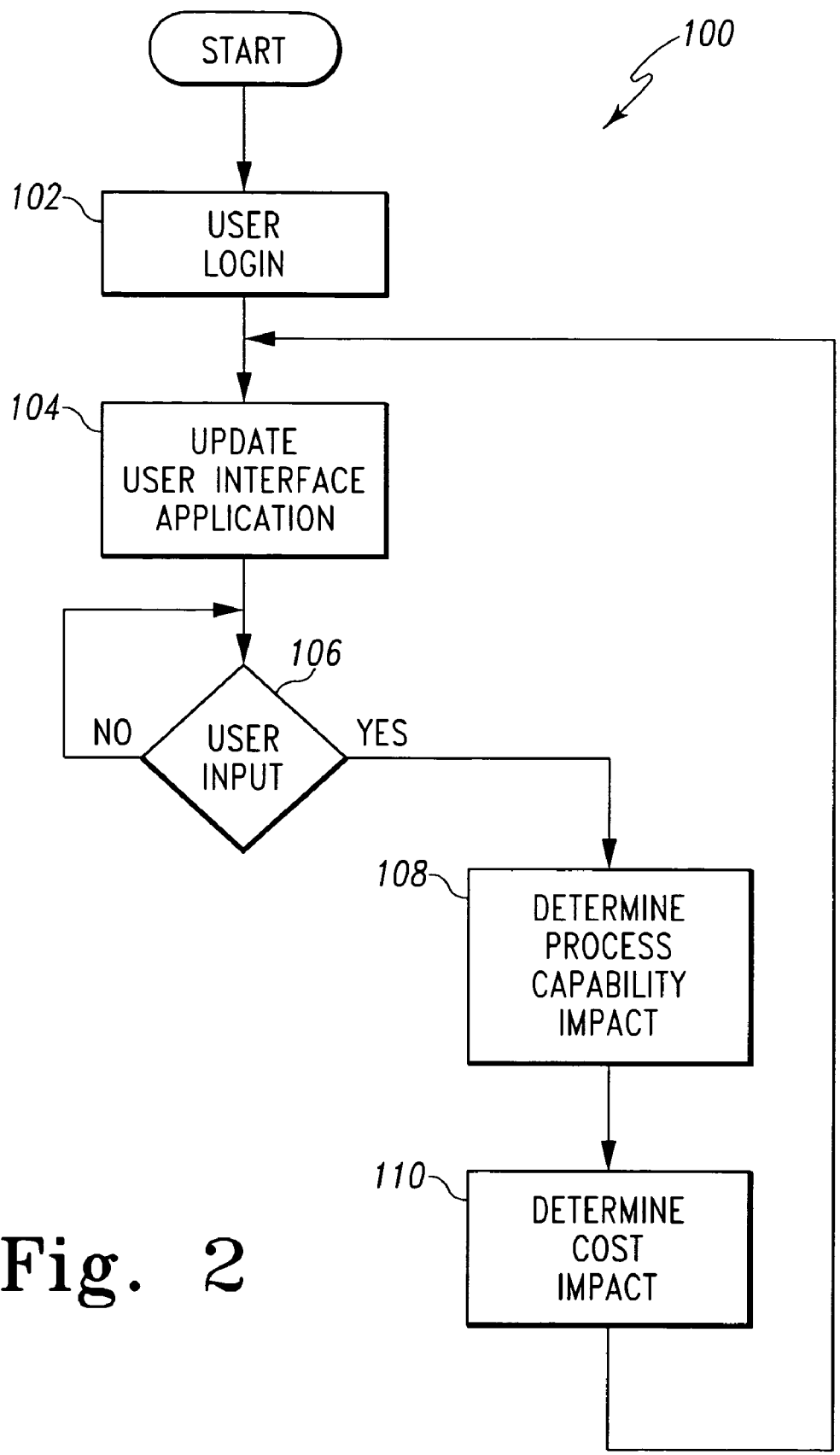
FIG. 2 is a flowchart of a routine for facilitating the design of a printed circuit board utilizing the system of FIG. 1.

Referring now to FIG. 2, there is shown a simplified flowchart which describes an exemplary routine 100 for facilitating the design of a bare circuit board in the manner described above. The routine 100 commences with step 102 in which the designer logs in to the system. In particular, the designer inputs a network address into, for example, a web browser software client running on client machine 14 thereby causing the client machine to be directed to the board manufacturer's web server 12 via the network 16. The web server 12 responds to this by generating a log-in screen which is displayed to the designer on the display monitor 22 of the client machine 14. The designer then enters her or his user name and password into the log-in screen, and this user name and password are transmitted to web server 12 for validation. At this point, the web server 12 may set a cookie on the client machine 14, as is known in the art. Furthermore, the web server machine 12 determines whether or not the user name and password are valid. If the user name and password are not valid, the web server 12 may allow the designer to try logging in again. However, if the user name and password are valid, then the routine 100 proceeds to step 104.

Once the designer is logged in, a graphical representation in the form of a user interface application is transmitted to the client 14 in step 104. The databases 28, 30 may also be transmitted to the client 14 by being hard coded in the user interface application or as separate databases. The user interface application may also include, amongst numerous other things, a number of data input fields for receiving user-input in the form of design characteristics associated with a given circuit board design. Such design characteristics may take the form of numerical data such as quantities, dimensions, tolerances, weights, timing, and the like. Such design characteristics may also take the form of non-numerical data such as "YES/NO" answers to queries presented to the designer, material types, colors, technology types, and the like. Data may be entered into each data input field by direct data entry by use of a keyboard coupled to the client 14 or by choosing a selection from a menu of choices provided to the designer.

Moreover, the user interface application may also include a number of output fields or graphical representations for displaying or otherwise communicating data or other types of information to the designer. For example, the user interface application may include a field for communicating to the designer the cost-per-board of the board design input by the designer. The interface application may also include a field for communicating to the designer the cost associated with the fixtures and/or tooling required to fabricate the board design input by the designer. The interface application may further include a graphical or text representation which communicates to the designer any violations, near violations, or potential violations of the board manufacturer's process capabilities based on the board design input by the designer.

It should be appreciated that when the designer initially logs in, the data input fields of the user interface application are either empty (i.e., devoid of information) or set to a default setting such as recommended or average data values. However, the designer may navigate through the screens associated with the user interface application and enter information relating to her or his design of a bare circuit board. In particular, the designer may enter information into the empty fields and/or change some or all of the default settings (if the designer does not want a particular default setting). As shown in step 106 of FIG. 2, when the designer enters information relating to her or his board design into one of the data input fields associated with the user interface application, a request for updated information is generated.

In response to the request, the user interface application queries the databases 28, 30 to obtain the necessary information to update the user interface application. In particular, the user interface application may query the process capability database 30 to obtain information necessary to make a determination as to if the data input by the designer violates or nearly violates any one or more of the process capabilities of the board manufacturer (step 108). Contemporaneously, the user interface application may also query the cost database 28 to obtain information necessary to make a determination as to any impact on the board cost and/or fixture/tooling cost caused by the data input by the designer (subroutine 110).

In the embodiments in which the databases 28, 30 remain stored on the data server 24 (i.e., versions of the databases 28, 30 are not hard coded into the user interface application or otherwise downloaded to the client 14), the request for updated information is transmitted through the network 16 to the gateway 26. The gateway 26 forwards the request to the data server 24. The data server 24 then queries the databases 28, 30 to obtain the necessary information to update the user interface application. Such information is retrieved from the databases 28, 30 and transmitted to the network gateway 26. The gateway subsequently forwards the data to the client 14 through the network 16.

Figure 3:
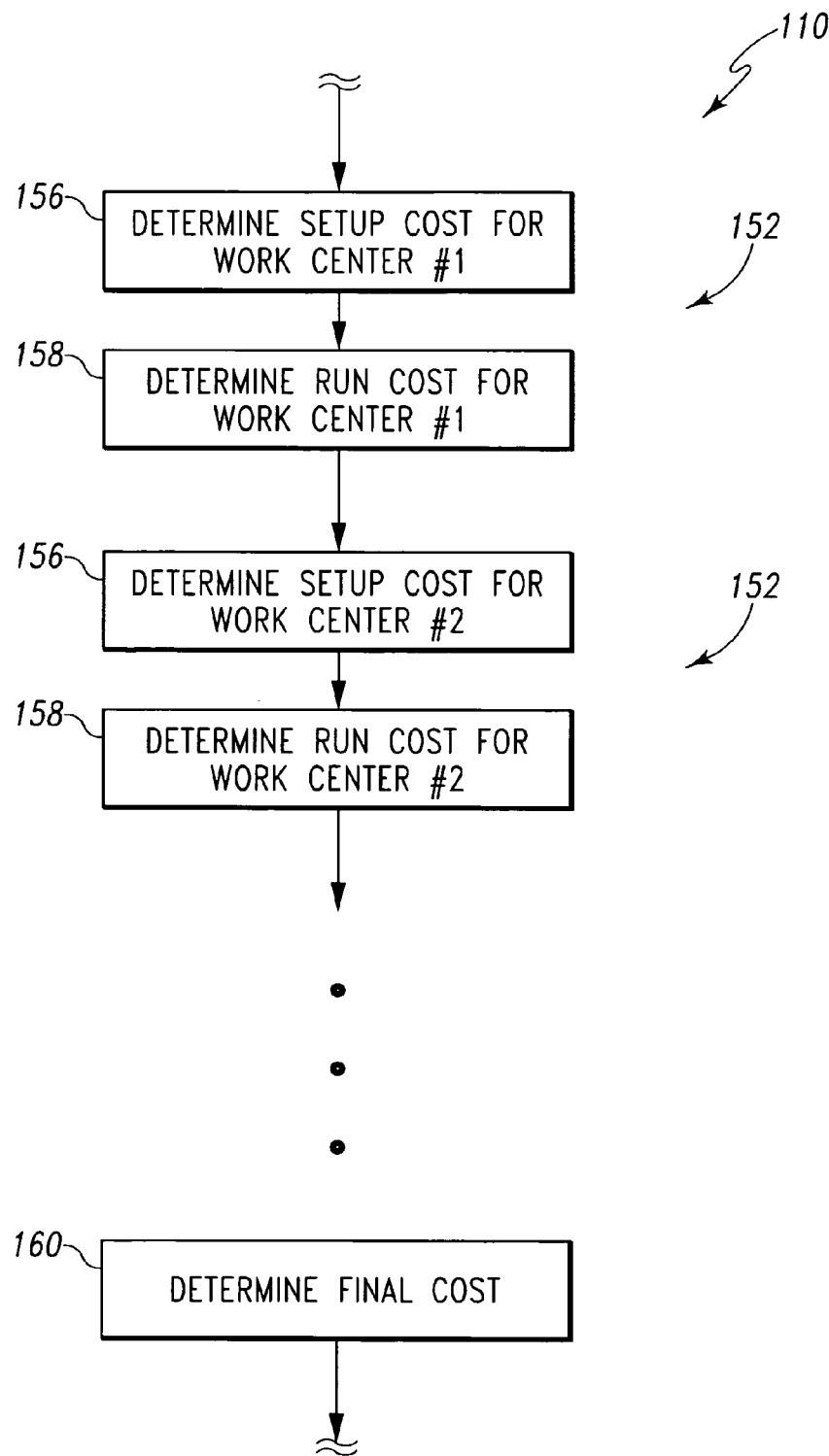
FIG. 3 is a flowchart of a routine for determining a cost value associated with the routine of FIG. 2.

As shown in FIG. 3, a subroutine 110 may be used to determine the impact, if any, on the board cost and/or fixture/tooling cost caused by the data input by the designer. The cost determination subroutine 110 includes a number of cost computation processes 152. Each cost computation process 152 is associated with a particular work center. Generally, a work center includes a collection of similar manufacturing steps such as a number of drilling steps. However, a work center may also be defined as a specific manufacturing step such as a circuit board masking step or, in fact, as any single or collection of manufacturing steps of the overall circuit board manufacturing process. A manufacturing process may include any number of work centers. Typically, the subroutine 110 includes a cost computation process 152 for each work center included in the manufacturing process. Each cost computation process 152 determines a per board setup cost and a per board run cost for the associated work center. Although the processes 152 are shown as executed in sequential order in FIG. 3, it should be appreciated that the processes 152 may be executed in any order, executed contemporaneously with each other, or selectively executed.

Each process 152 begins with a step 156 in which a setup cost for the associated work center is determined. The setup cost for each work center is based on a fixed setup cost value, typically based off of a setup time value, which is dependent upon the particular work center. For example, a work center associated with a circuit board masking process may have a setup cost that is defined as a predetermined fixed cost value. However, work centers that have a plurality of processing steps, such as a work center having a plurality of hole drilling process steps, may have a setup cost that includes both a predetermined fixed cost value and an additional tool setup cost. The tool setup cost is based on a separate fixed tool setup cost value multiplied by the number of processing steps in the work center. For example, a work center in which thirty (30) holes are drilled into a circuit board, the setup cost may be defined as the sum of a fixed cost value and a tool setup cost. The tool setup cost for such a work center may include a separate fixed tool setup cost value multiplied by thirty (30). The fixed cost value of both types of work centers may be equal or not equal to each other depending upon the overall manufacturing process.

The setup cost is a one time cost value associated with the work center and is not dependent on the number of circuit boards to be processed. Accordingly, the setup cost is divided by the total number of circuit boards in the overall manufacturing process to arrive at a per board setup cost value.

Each process 152 also includes a step 158 in which a run cost for the associated work center is determined. The run cost for each work center is based on a fixed run cost value, typically based on a run time value, which is dependent upon the particular work center. The fixed run cost value is multiplied by either the panel count or the number of circuit boards to be processed. In work centers in which the processing step(s) of the work center can be applied to whole circuit board panels, such as a work center including a circuit board masking process, the run cost is determined by multiplying a fixed run cost value by the number of circuit board panels in the manufacturing process divided by the total number of circuit boards to be processed. For example, a work center having a circuit board masking process in which 100 circuit board panels having 5 circuit boards per panel may have a run cost that is defined by a fixed run cost value multiplied by one hundred (i.e., the panel count) and divided by five hundred (i.e., the total number of circuit boards).

In work centers in which the processing step(s) of the work center can not be applied to whole circuit board panels, such as a work center in which a plurality of mounting holes are drilled at the extremities of the circuit board, the run cost is determined by multiplying a fixed run cost value by the number of processing steps in the work center (e.g., the number of holes to be drilled in the circuit board). For example, a work center in which thirty (30) holes are drilled into the circuit board may have a run cost defined as a fixed run cost value, typically based on of a time value related to drilling time, multiplied by thirty (30).

The run cost is a cost applicable to each circuit board to be manufactured. Specifically, unlike the tool setup cost the total run cost is dependent on the number of circuit boards being manufactured.

The final or "total" per board cost value for the manufacturing process is determined in step 160. The final cost value is the sum of a final per board setup cost value and a final per board run cost value. The final per board setup cost value is determined by summing the per board setup costs of each work center. The final per board run cost value is determined by summing the run costs of each work center. In some embodiments, additional cost charges or cost discounts may be applied to either of the final setup cost and/or the final per board run cost based on aspects or criteria of the circuit board design such as circuit board type, number of boards to be manufactured, manufacturing difficulty, and the like.

A fixture/tooling cost is also determined in process step 160. The fixture/tooling cost is a fixed cost based on the overall manufacturing process. The fixture/tooling cost includes such costs as machine software design charges, special machine setup charges, additional design charges, and the like. Generally, the fixture/tooling cost is a cost applicable on a one time basis and, accordingly, subsequent manufacturing processes of the same circuit board design will not incur further fixture/tooling costs.

As shown in FIG. 2, once the requested data is extracted from the appropriate database 28, 30, and the necessary computations completed, the control routine 100 loops back to step 104 in which the user interface application is updated based on the cost data and process capability data. Such update may include displaying the cost data and/or the process capability data or otherwise altering the displayed user interface application based on the cost data and/or process capability data. The designer may then continue to navigate around the user interface application and continue inputting additional data associated with her or his board design.

An illustrative user interface application (designated with reference numeral 200) is shown in FIGS. 3–15. The user interface application 200 includes a cost-per-board display 202 and a fixture/tooling cost display 204. In alternative embodiments, the user interface application 200 may include additional displays to display a complete set or portion thereof of the setup and run costs associated with each work center. The final per board cost value, as determined in process step 160 of subroutine 110, is displayed in the cost-per-board display 202. The application 200 also includes a process capability display 206. In the exemplary embodiment described herein, the process capability display 206 is embodied as a stop light having a RED, YELLOW, and GREEN "light."

Figure 4:
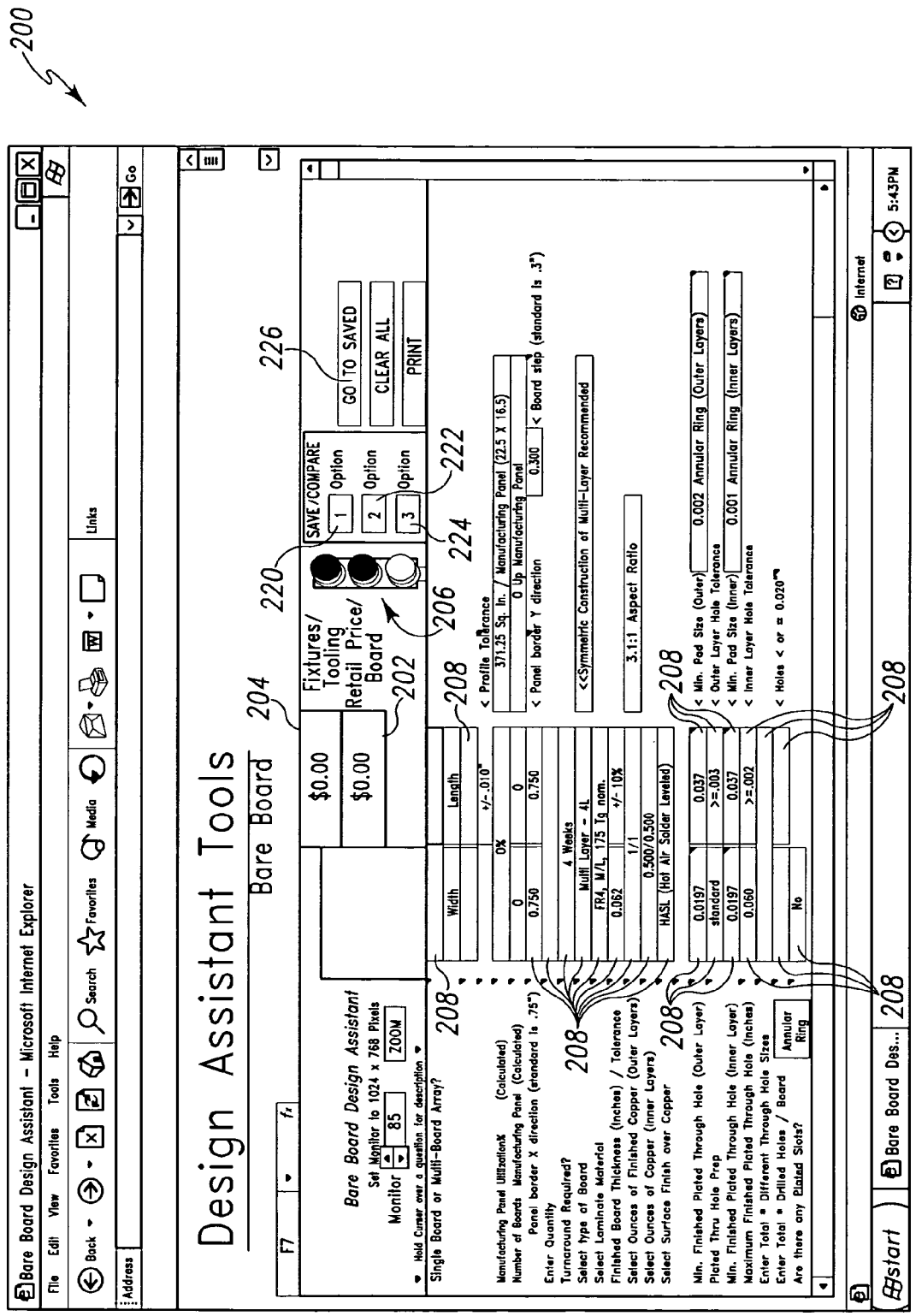
Figure 6:
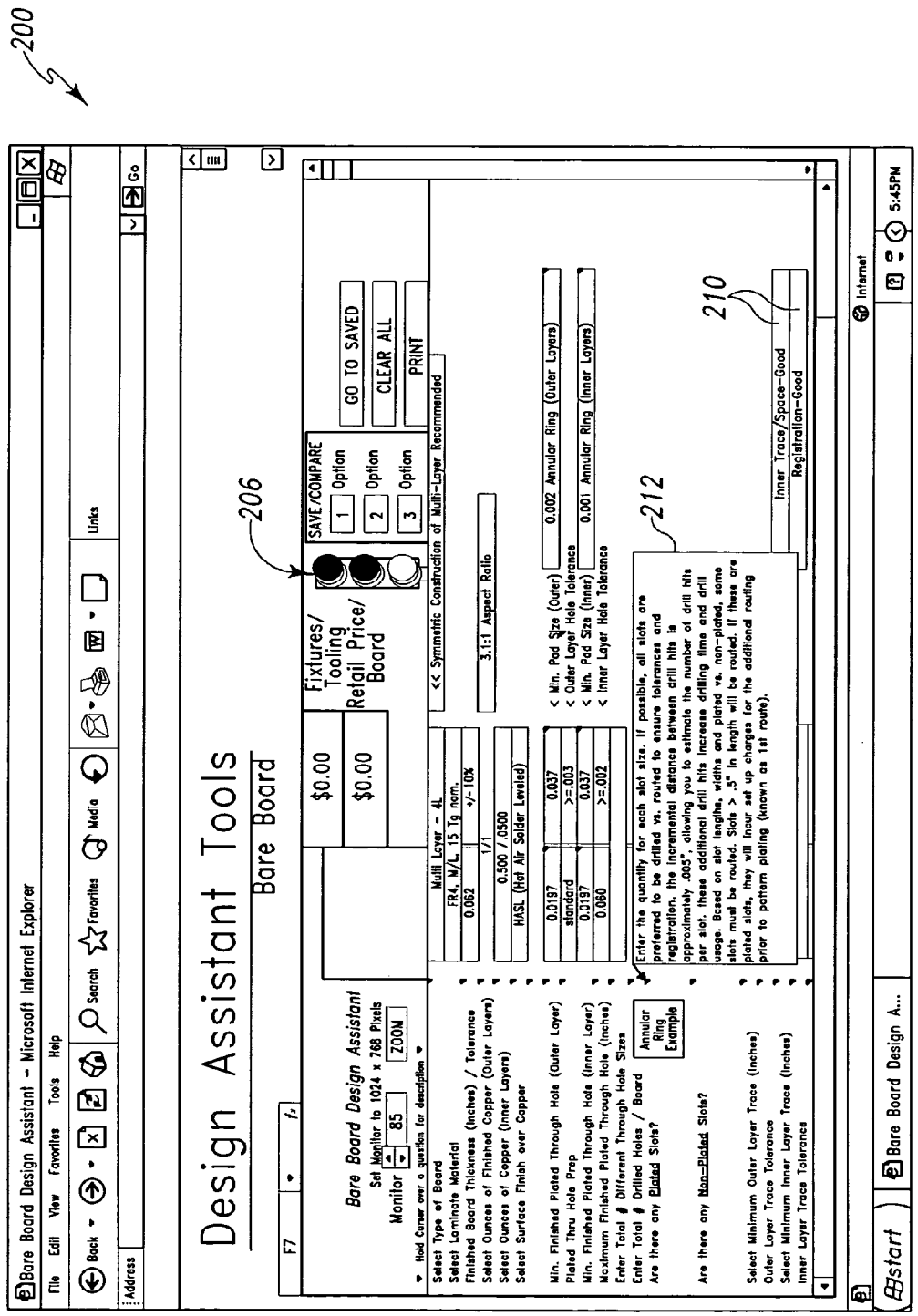

The user interface application 200 also includes a number of data input fields 208. As shown in FIG. 4, the data input fields 208 may be used by the designer to input design characteristics or other information about the designer's board design. For example, by use of the data input fields 208, the designer may enter information relating to the physical dimensions of the board, the quantity of boards needed, the turnaround time for fulfilling the order, the type of board (e.g., single-sided, double-sided, or multilayer), the laminate material to be used, the amount (e.g., ounces) of copper used in the outer layer, the surface finish for the board, hole information (number, type, number of different sizes, annular ring dimensions and tolerances, etcetera), pattern information (e.g., size of the lines and spaces, pad configurations), the type and configuration of any solder mask to be used. Other characteristics may also be input by the designer such as whether the design utilizes plugged, blind, or buried vias or gold contact fingers, whether silk screening is needed, or whether the board is to be electrically tested. The user interface application may also be configured to accept data relating to other characteristics to fit the needs of a given board process or vendor.

Figure 5:
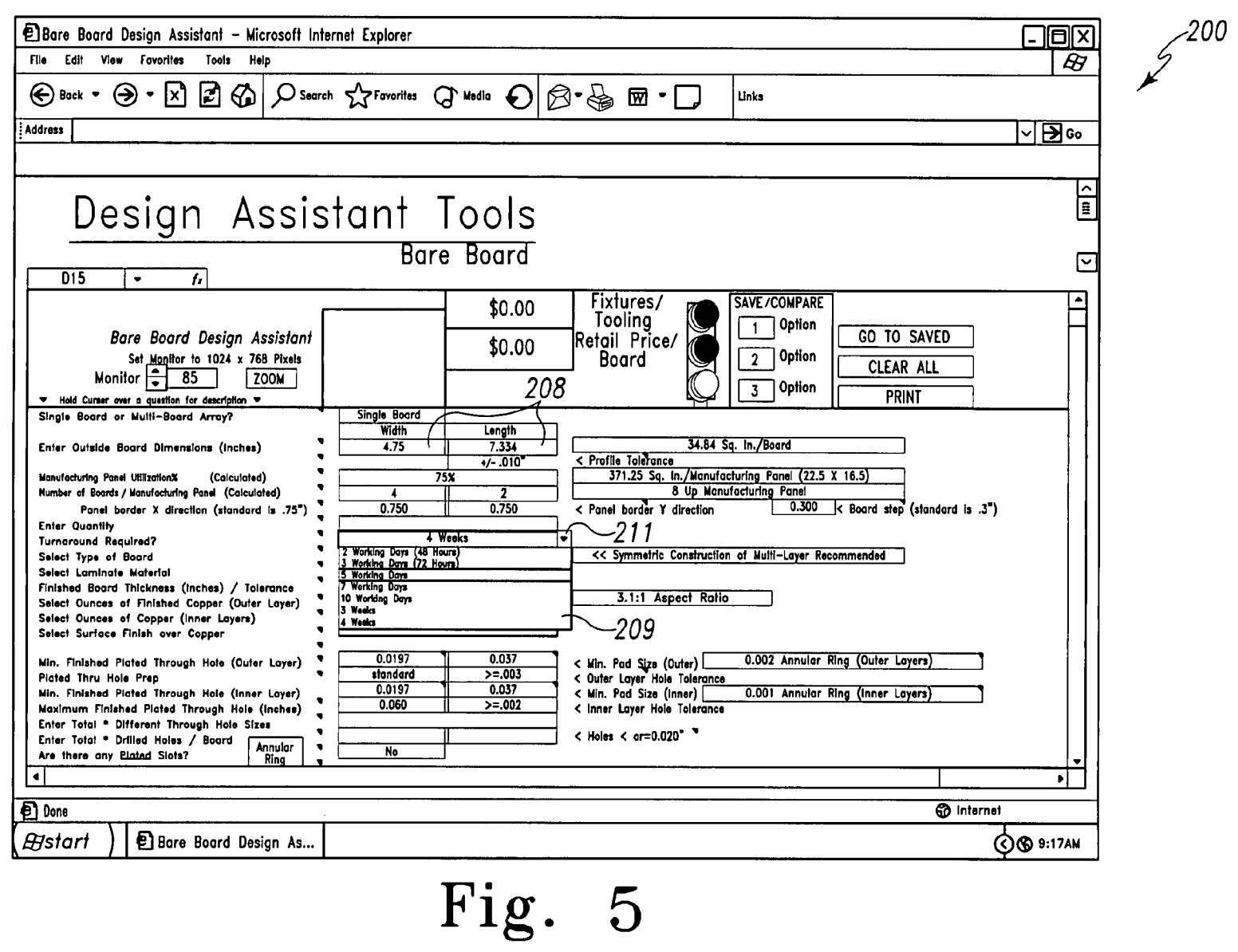

As shown in FIG. 5, data may be entered into the data input fields 208 by direct data input (i.e., the entering of data via a keyboard coupled to the client 14) or by choosing a selection from an associated menu 209 of choices. A menu 209 may be used for data entry in those data input fields 208 in which a restricted range of acceptable values, data, or other choices is desirable to, for example, reduce the possibility of entering incorrect data. To do so, the data input field 208 may be embodied to include a pull-down button 211. Typically, the menu 209 is "hidden" until a user of the application 200 selects the pull-down button 211 to "call up" or otherwise display the menu 209. Once a user has made a selection from the menu 209, the menu 209 is once again "hidden" or otherwise removed from the display of the application 200 and the selected value or menu choice is displayed in the associated data input field 208.

As such, when the designer enters information associated with a given data field 208, the amounts displayed in the cost-per-board display 202 and/or the fixture/tooling cost display 204 are updated for presentation to the designer. In other words, as the designer enters information into the application 200, the designer gets immediate feedback as to the impact on the cost of the board caused by the entered values. Moreover, the designer is provided with feedback as to whether any entered information (or combination of entered information) violates or nearly violates the board manufacturer's process capabilities. In particular, in the exemplary embodiment of the user interface application 200 described herein, process compatibility information is displayed in the form of a number of RED, YELLOW, or GREEN banners 210 (see FIG. 6) which appear next to a given data field 208. In addition to the banners 210, the stop light 206 is also used to warn the designer of any potential design problems. In particular, if a data entry in one or more data fields 208 (or combination of entries) violates the board manufacturer's process capability, then a RED banner 210 appears next to the entry listing the violation and the stop light 206 goes to RED. If the data entry is acceptable, but carries a yield or cost penalty, then a YELLOW banner 210 appears next to the entry listing the extra cost item and the stop light 206 goes to YELLOW. If all entries are within the process capability of the board manufacturer, then the banners 210 are GREEN and the stop light 210 goes to GREEN.

Each of the data fields 208 has an associated tutorial box 212 (see FIG. 6) that explains the purpose and type of the entry. The tutorial box 212 for a given data entry field may be "called up" for display or otherwise activated by holding the cursor over the question associated with the data field 208. The tutorial box 212 may contain data entry instructions, recommendations for values or selections, warnings, or other additional information related to the associated question.

Figure 7:
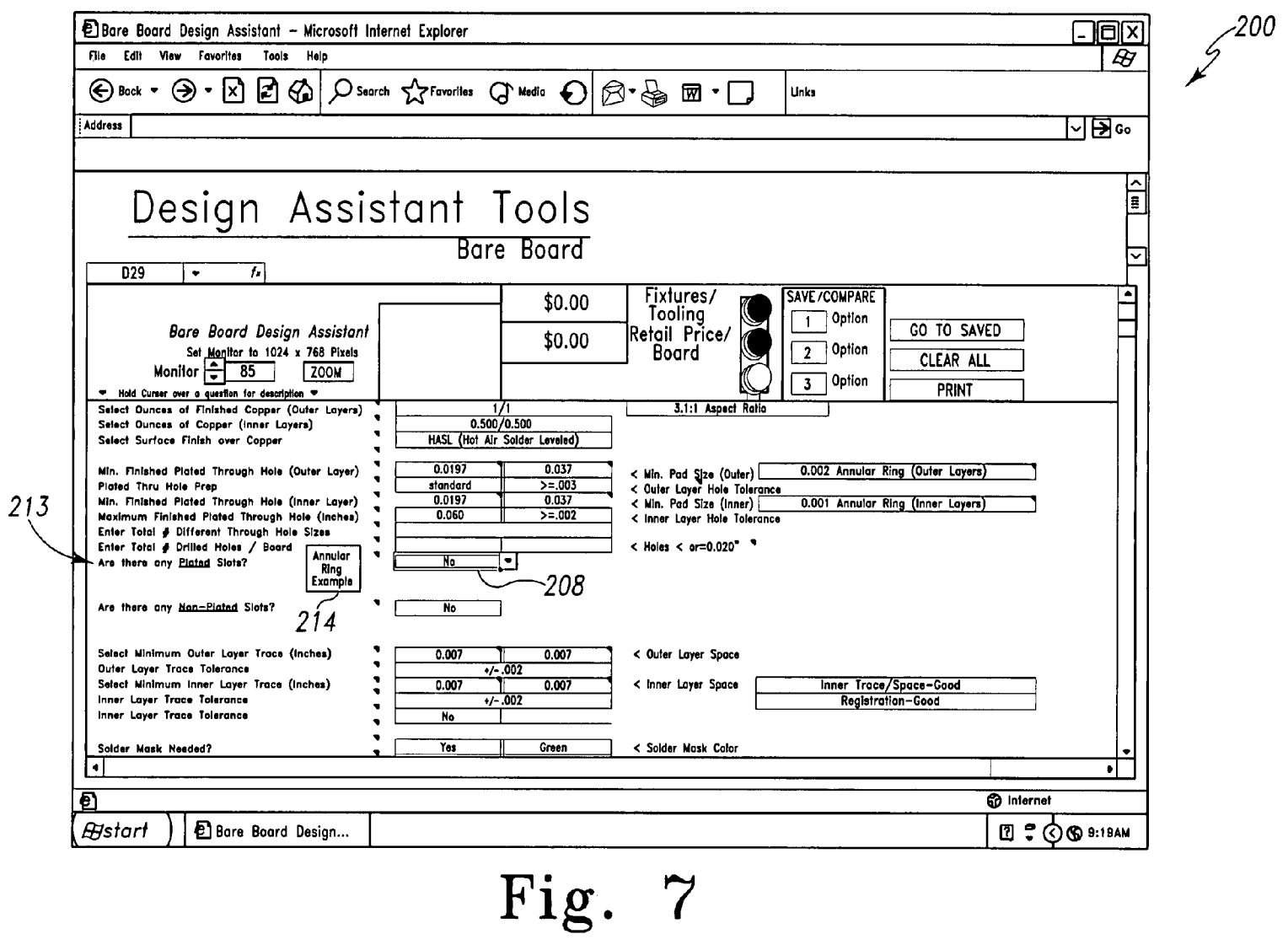
Figure 8:
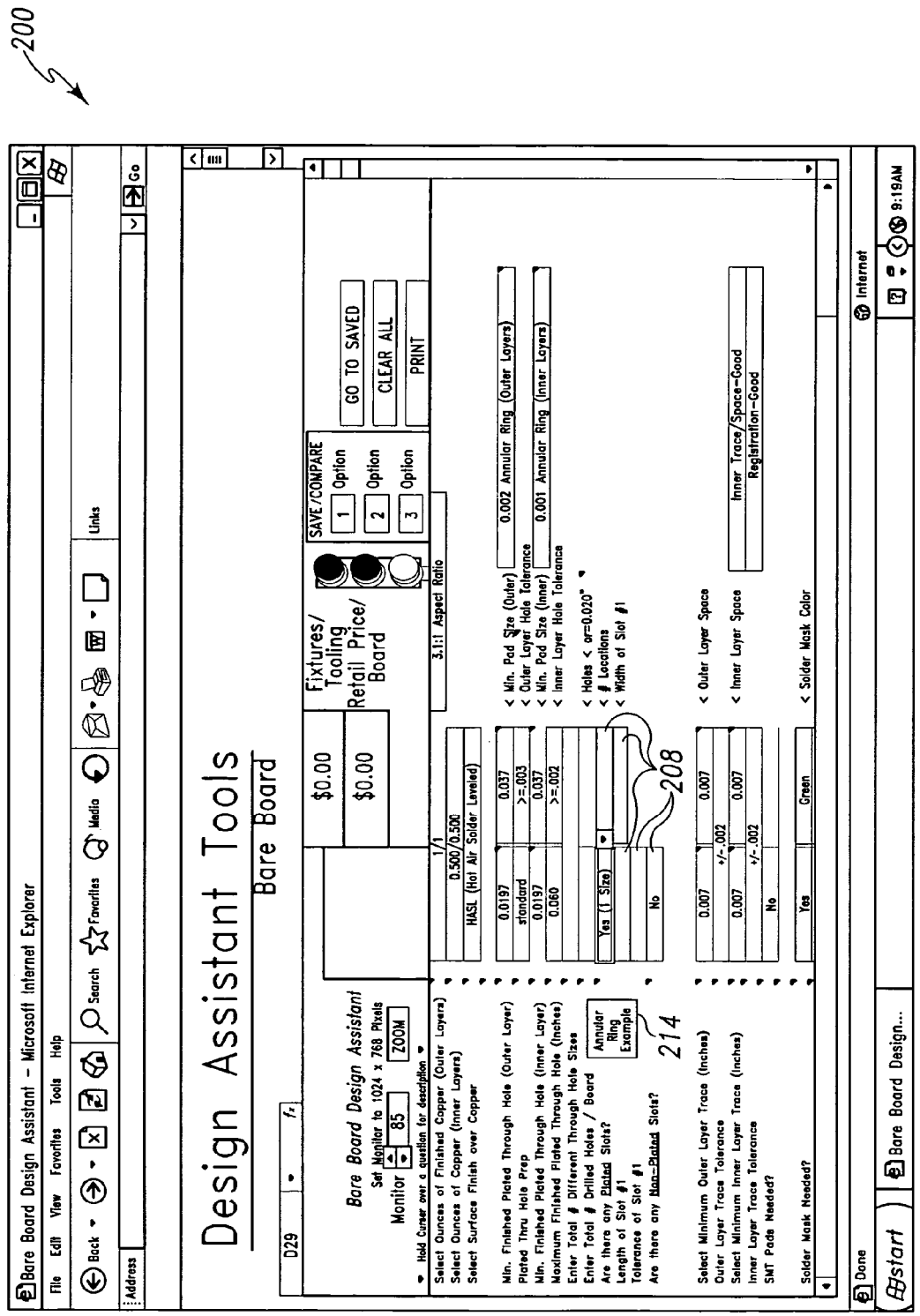
Figure 9:
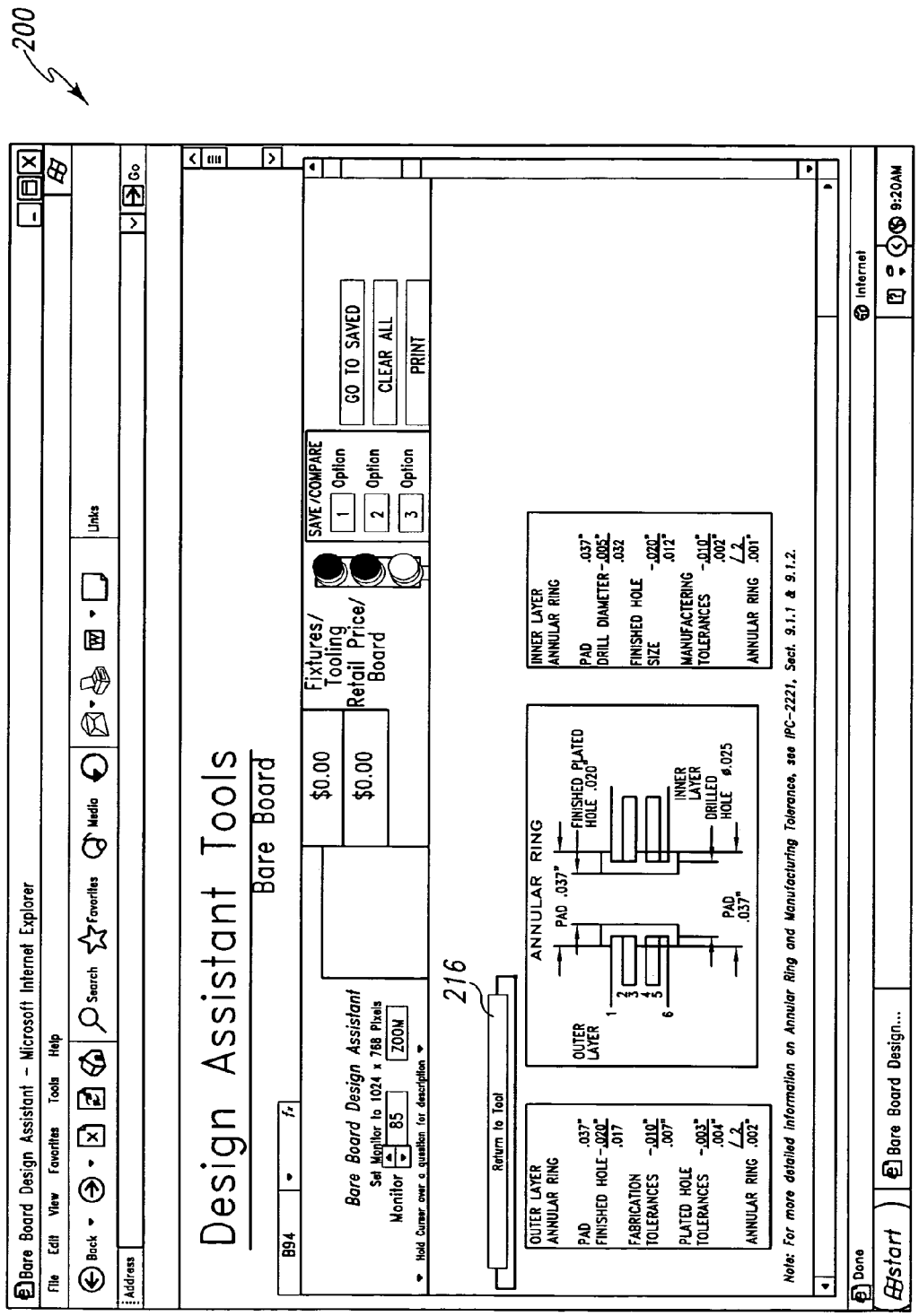

Referring now to FIGS. 7 and 8, some data input fields 208 may not be displayed or otherwise accessible to the designer until the designer has entered data in a related data input field 208. For example, as shown in FIG. 7, additional data input fields 208 related to a question 213 are not initially accessible to the user. However, once the user has entered data in the related data field 208 of FIG. 7, additional data input fields 208 become visible as shown in FIG. 8. The user may subsequently enter data related to the question 213 in the now accessible data input fields 208. Further, additional graphics in the form of, for example, a "button" may be used in conjunction with certain data fields 208. This is particularly useful to clarify any questions which may include industry jargon. For example, as shown in FIGS. 7 and 8, the term, "annular ring" has a jump-to graphic in the form of a button 214. When the designer clicks on the button 214, a page is displayed to the designer which provides technical information relating to annular rings (see FIG. 9) thereby allowing the designer to more fully appreciate the question being asked. Once the designer has obtained the information needed to clarify her or his understanding, the designer clicks a return button 216 thereby returning the designer to the main screen of the user interface application 200.

Figure 10:
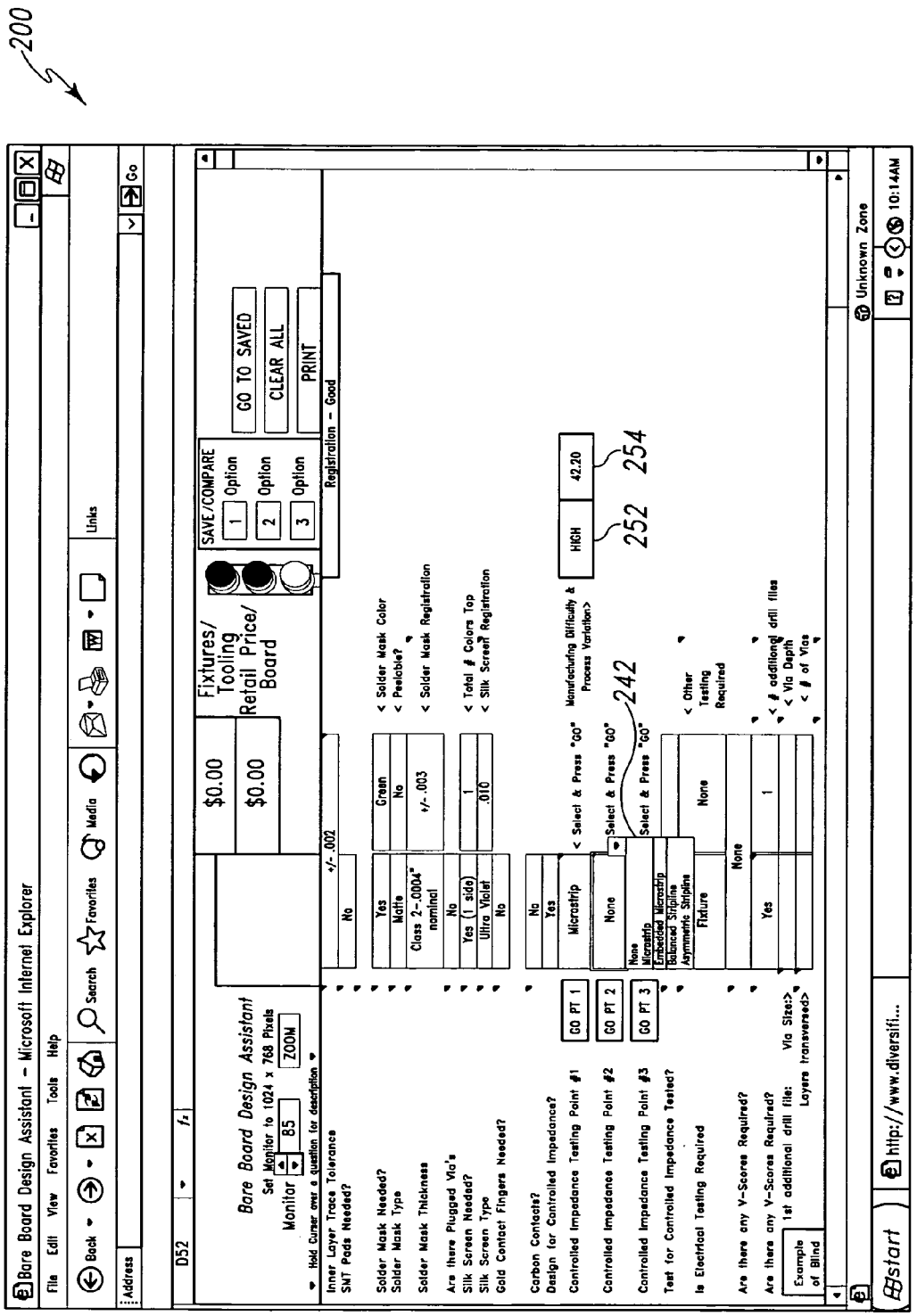
Figure 11:
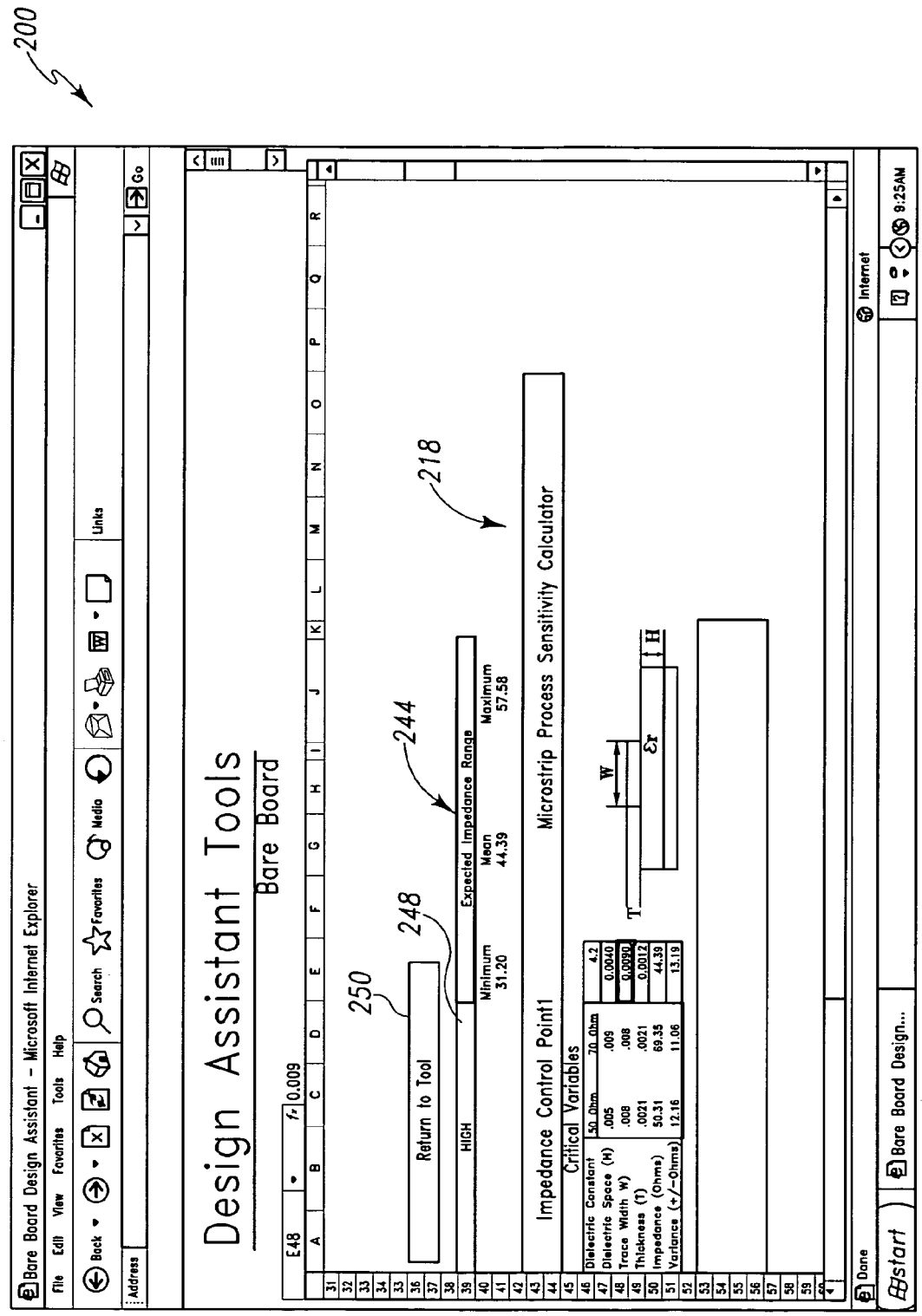

The user interface application 200 may include additional functionality and features useful to the designer in making design decisions. For example, the application 200 may include controlled impedance functionality by which the designer may determine and control the impedance established between the metal traces of the circuit board. For example, as shown in FIG. 10, a number of controlled impedance testing point selections 240 are provided to the designer. The number of provided testing point selections 240 may be fixed or may be based on any one of a number of criteria such as the number of layers contained in the circuit board, printed features on the circuit board, and other design decisions. For each controlled testing point selection 240, the designer may select the type of impedance from a selection menu 242. Once the designer selects the type of impedance form the menu 242, the user interface application 200 presents the designer with an impedance calculator 218 as shown in FIG. 11. The impedance calculator 218 is configured according to the type of impedance selected from the menu 242. Some data fields of the impedance calculator 218 are preloaded based on information already entered by the designer. Other data fields are empty, but may have suggested values that are consistent with the design parameters displayed next to the data field. Based on the data entered by the designer, the impedance calculator 218 determines the manufacturing difficulty of the design and displays the difficulty level in a display window 248. The impedance calculator 218 also calculates a low, high, and mean impedance value which are displayed in an expected impedance table 244. In the exemplary embodiment described herein, these values are derived from the actual processing capabilities of the board manufacturer (i.e., they are not simply theoretical calculations from an engineering handbook). The range of values allows the designer to determine if the board design is able to withstand the manufacturing tolerances. Such use of actual processing data is advantageous relative to other calculators that provide only a median value that is a pure calculation from the field and wave theory. Use of a calculation based on "real world" manufacturing tolerances and material variations provides the designer with a better estimate of the finished product.

After the designer has achieved an acceptable impedance value, the designer may "click" or otherwise select a return button 250 to return the designer to the main screen of the user interface application 200. As shown in FIG. 10, the determined manufacturing difficulty level and the process variation value of the impedance, which is calculated by the impedance calculator 218, are displayed to the designer in respective data windows 252, 254.

Figure 12:
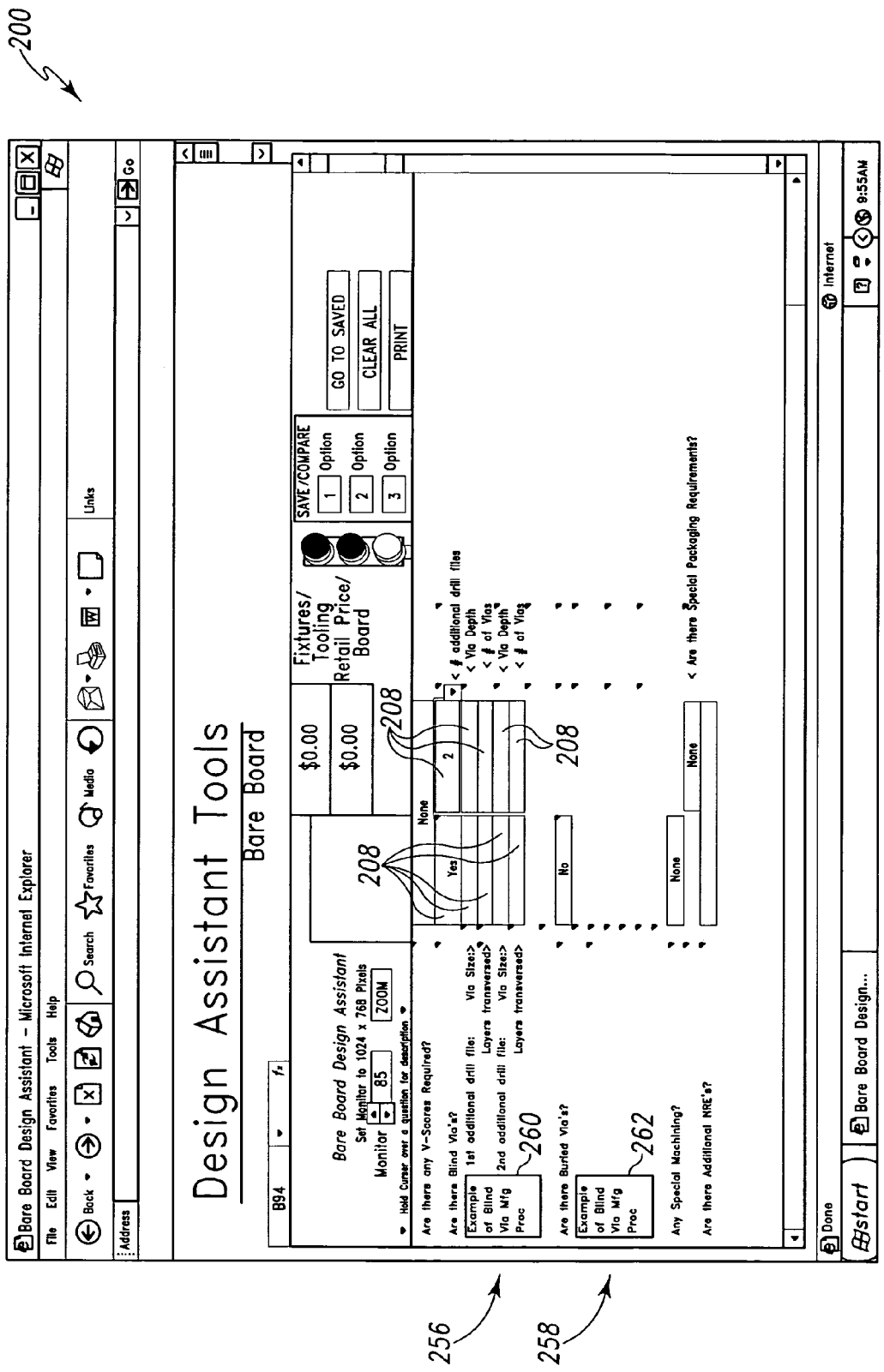
Figure 13:
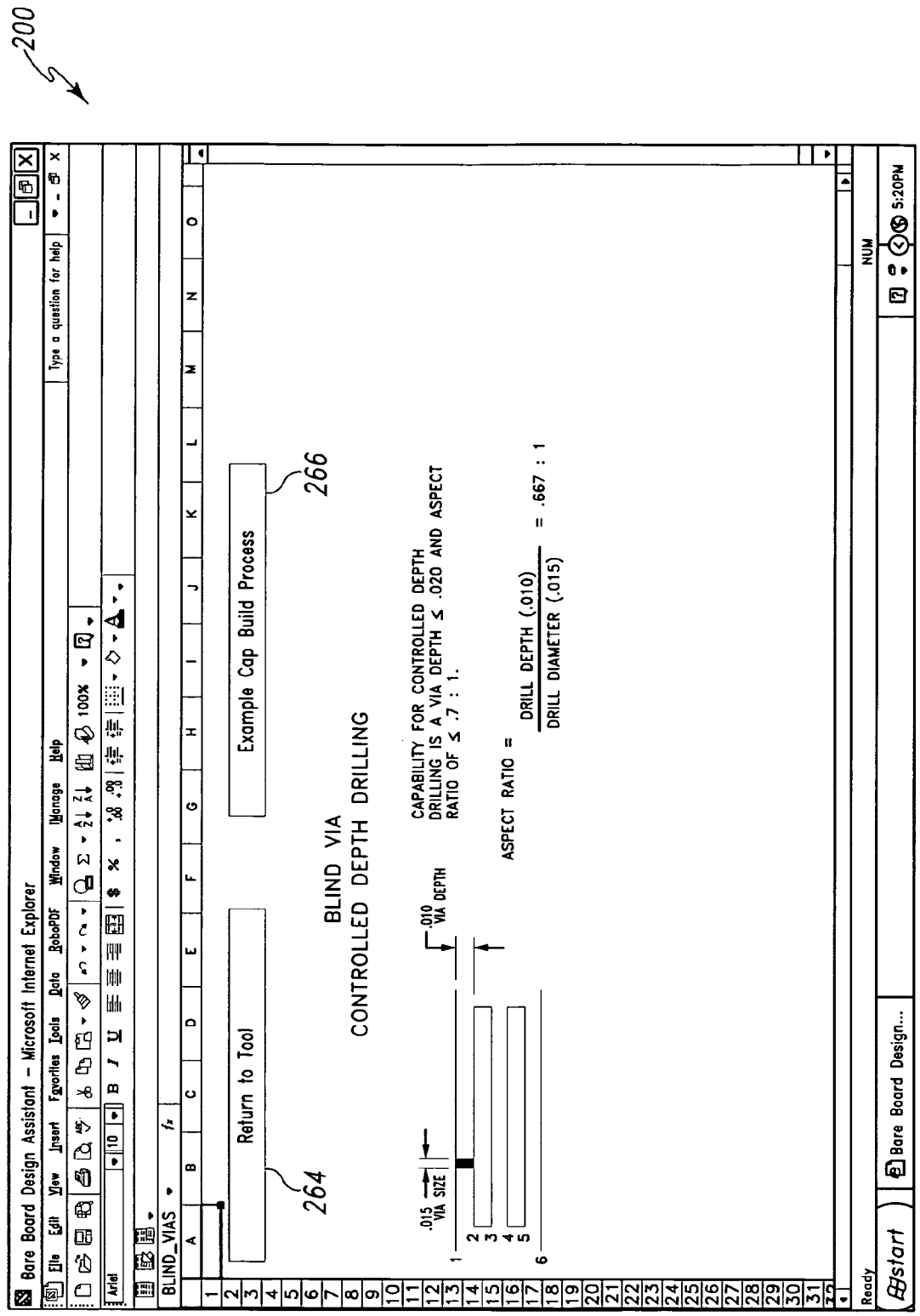
Figure 14:
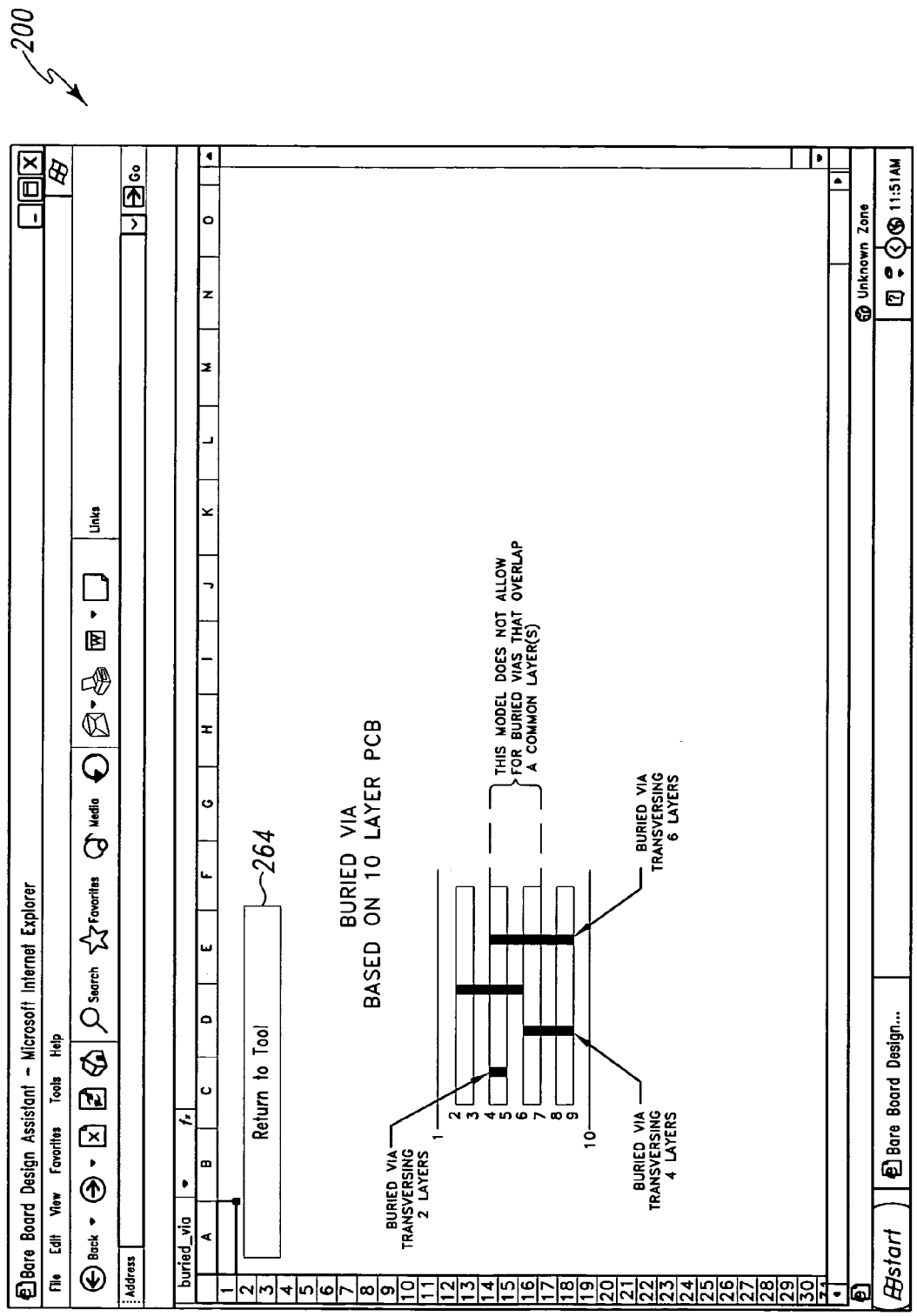

The user interface application 200 may also include "via" design functionality. For example as shown in FIG. 12, the application 200 includes "blind via" and "buried via" design capability. A number of input data fields 208 are associated with each "via" type. The input data fields 208 may be empty or pre-filled with recommended values or other selections. To design the selected "via" type, the user enters data in the associated data fields 208 such as the "via" size, "via" depth, the number of "vias", and the identification of the layers trasversed. Examples of various types of "blind vias" and "buried vias" may be viewed by the designer by selecting an appropriate example button 260, 262 associated with each "via" type. When the designer clicks on the button 260, 262, a page is displayed to the designer showing a diagrammatic illustration of the "via" type, additional technical information, and any recommendations related to the selected "via" type (see FIGS. 14 and 15). Once the designer has obtained the information needed to clarify her or his understanding, the designer may click on a return button 264 to return to the main screen of the application 200 or select another example button 266 to view diagrammatic representations of other "via" types. It should be appreciated that any number of diagrammatic illustration and secondary information pages may be associated with each example button 260, 262. Further, it should be appreciated that the application 200 may include any number of example or description buttons 260, 262 to better clarify questions.

Once the designer has entered a desired amount of information relating to a board design, the designer may save the configuration of the board design for subsequent comparison to other designs or modifications of the current design. In particular, the designer may click on a "SAVE OPTION 1"

button 220 to save the current configuration of the board design. The designer may then configure and save, for example, two more configurations by use of a "SAVE OPTION 2" button 222 and a "SAVE OPTION 3" button 224, respectively. Thereafter, if the designer clicks on a "GO TO SAVED" button 226, a summary page 228 is displayed, as shown in FIG. 15. In such a way, multiple configurations may be viewed side-by-side thereby allowing the designer to compare the impact of her or his changes. The summary page may be printed by use of "PRINT" button 230. Moreover, any one or all of the configurations may be cleared by selecting the appropriate "CLEAR" button 232. Note also that a "PRINT" button and a "CLEAR ALL" button are available on the main page of the user interface application. The summary page 228 also includes a "RETURN" button 234 for returning the designer to the main page of the user interface application 200.

In the exemplary embodiment described herein, the user interface application 200 is designed using a programming language and an associated spreadsheet program such as Visual Basic and Excel which are both commercially available from Microsoft of Redwood, Wash. However, it should be appreciated that the user interface application 200 may be designed using any of a number of other programming languages, tools, and standards to obtain similar functionality and capabilities of the illustrative user interface application 200.

In summary, the concepts of the present disclosure provide a network-based source of a wide range of information that a design engineer may need to properly perform her or his task. At a base level, it provides the cost of the circuit board. However, the designer can play "what if" games with the user interface application and save these scenarios for comparison. These "what if" games may be used to determine the impact of technology or other design-change decisions. Moreover, in addition to providing the designer with cost information, the concepts disclosed herein also show where the technology goes from easy to hard to impossible (e.g., by use of the Green, Yellow, and Red banners and the stop light).

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, methods, systems, and programs described herein. It will be noted that alternative embodiments of each of the apparatus, methods, systems, and programs of the present disclosure may not include all of the features described yet still benefit from at least some of the advantages of such features. Those of ordinary skill in the art may readily devise their own implementations of apparatus, methods, systems, and programs that incorporate one or more of the features of the present invention and fall within the spirit and scope of the present disclosure.

For example, although the software concepts disclosed herein are described as already being loaded or otherwise maintained on a computing device (e.g., either a client or server machine), it should be appreciated that the present disclosure is intended to cover the software concepts described herein irrespective of the manner in which such software concepts are disseminated. For instance, the software concepts of the present disclosure, in practice, could be disseminated via any one or more types of a recordable data storage medium such as a modulated carrier signal, a magnetic data storage medium, an optical data storage medium, a biological data storage medium, an atomic data storage medium, and/or any other suitable storage medium.

The invention claimed is:

1. A method for designing a circuit board, the method comprising:
    transmitting a user interface that requests entry of circuit board design data,
    receiving user-supplied circuit board design data via the user interface,
    retrieving circuit board manufacturing capability data from a manufacturing capability database in response to the user-supplied circuit board design data,
    determining whether the user-supplied circuit board design data exceeds manufacturing capability of a circuit board manufacturer based on a comparison of the user-supplied circuit board design data and the circuit board manufacturing capability data, and
    updating the user interface if the user-supplied circuit board design data exceeds the manufacturing capability of the circuit board manufacturer.

2. The method of claim 1, wherein the transmitting of the user interface comprises transmitting the user interface to a client machine via a publicly-accessible global network in response to a user-supplied request received via the publicly-accessible global network.

3. The method of claim 1, wherein the transmitting of the user interface comprises transmitting the user interface application from a server machine to a client machine via the Internet.

4. The method claim 1, wherein the transmitting of the user interface comprises transmitting the manufacturing capability database with the user interface from a server machine to a client machine via a publicly-accessible global network.

5. The method of claim 1, wherein the receiving of the user-supplied circuit board design data comprises receiving the user-supplied circuit board design data via an input device of a client machine.

6. The method of claim 1, wherein the receiving of the user-supplied circuit board design data comprises receiving the user-supplied circuit board design data via a publicly-accessible global network.

7. The method of claim 1, wherein the retrieving of the circuit board manufacturing capability data comprises retrieving the circuit board manufacturing capability data from the manufacturing capability database stored on a client machine in response to the user-supplied circuit board design data.

8. The method of claim 1, wherein the retrieving of the circuit board manufacturing capability data comprises retrieving the circuit board manufacturing capability data, via a publicly-accessible global network, from the manufacturing capability database stored on a server machine based on the user-supplied circuit board design data.

9. The method of claim 8, wherein the retrieving of the circuit board manufacturing capability data comprises retrieving the circuit board manufacturing capability data from a server machine via a publicly-accessible global network.

10. The method of claim 1, wherein the updating of the user interface comprises displaying a traffic light image to a user.

11. The method of claim 1, further comprising:
  determining a user selected-portion of the user interface,
  retrieving a circuit board design image based on the user selected-portion of the user interface, and
  displaying the circuit board design image on the user interface to a user.

12. A method for designing a circuit board, the method comprising:
  transmitting a user interface that requests entry of circuit board design data,
  receiving user-supplied circuit board design data via the user interface,
  retrieving circuit board manufacturing cost data associated with the user-supplied circuit board design data from a manufacturing cost database,
  retrieving circuit board manufacturing capability data from a manufacturing capability database in response to the user-supplied circuit board design data,
  determining a number of work centers of a circuit board manufacturing process for manufacturing the circuit board defined by the user-supplied circuit board design data,
  determining a per-circuit-board setup cost value and a per-circuit-board run cost value for each work center,
  determining a per-circuit-board cost using the per-circuit-board setup cost value and the per-circuit-board run cost value for each work center,
  determining whether the user-supplied circuit board design data exceeds manufacturing capability of a circuit board manufacturer based on a comparison of the user-supplied circuit board design data and the circuit board manufacturing capability data,
  displaying the per-circuit-board cost on the user interface, and
  notifying a user by updating the user interface if the user-supplied circuit board design data exceeds the manufacturing capability of a circuit board manufacturer.

13. The method of claim 12, wherein the transmitting of the user interface comprises transmitting the user interface to a client machine via a publicly-accessible global network in response to a user-supplied request received by a server machine via a publicly-accessible global network.

14. The method of claim 12, wherein the transmitting of the user interface comprises transmitting the user interface from a server machine to a client machine via the Internet.

15. The method claim 12, wherein the transmitting of the user interface comprises transmitting the manufacturing cost database and the manufacturing capability database from a server machine to a client machine via a publicly-accessible global network.

16. The method of claim 12, wherein the receiving of the user-supplied circuit board design data comprises receiving the user-supplied circuit board design data via an input device of a client machine.

17. The method of claim 12, wherein the receiving of the user-supplied circuit board design data comprises receiving the user-supplied circuit board design data via a publicly-accessible global network.

18. The method of claim 12, wherein the retrieving of the circuit board manufacturing cost data comprises retrieving circuit board manufacturing cost data from the manufacturing cost database stored on a client machine in response to the user-supplied circuit board design data.

19. The method of claim 12, wherein the retrieving of the circuit board manufacturing cost data comprises retrieving the circuit board manufacturing cost data from the manufacturing cost database stored on a server machine in response to the user-supplied circuit board design data.

20. The method of claim 12, wherein the retrieving of the circuit board manufacturing cost data comprises retrieving the circuit board manufacturing cost data from the manufacturing cost database via a publicly-accessible global network.

21. The method of claim 12, wherein the retrieving of the circuit board manufacturing capability data comprises retrieving the circuit board manufacturing capability data from the manufacturing capability database stored on a client machine in response to the user-supplied circuit board design data.

22. The method of claim 12, wherein the retrieving of the circuit board manufacturing capability data comprises retrieving the circuit board manufacturing capability data from the manufacturing capability database stored on a server machine in response to the user-supplied circuit board design data.

23. The method of claim 12, wherein the retrieving of the circuit board manufacturing capability data comprises retrieving the circuit board manufacturing capability data from the manufacturing capability database via a publicly-accessible global network.

24. The method of claim 12, wherein notifying a user by updating the user interface comprises displaying a traffic light image to a user.

25. The method of claim 12, further comprising determining a tooling cost value based on the user-supplied circuit board design data.

26. The method of claim 25, wherein the determining of the tooling cost value comprises determining the tooling cost value based on the circuit board manufacturing cost data.

27. An article comprising a computer-readable signal-bearing medium having therein a plurality of instructions which, when executed by a processor, cause the processor to:
  display a user interface that requests entry of circuit board design data to a user,
  retrieve circuit board manufacturing cost data associated with the circuit board design data supplied by the user via the user interface from a manufacturing cost database,
  retrieve circuit board manufacturing capability data from a manufacturing capability database in response to the circuit board design data,
  determine a per-circuit-board cost using the circuit board manufacturing cost data;
  determine whether the circuit board design data exceeds manufacturing capability of a circuit board manufacturer based on a comparison of the circuit board design data and the circuit board manufacturing capability data,
  display the per-circuit-board cost on the user interface, and
  notify the user if the circuit board design data exceeds the manufacturing capability of the circuit board manufacturer.

28. The article of claim 27, wherein the to retrieve the circuit board manufacturing cost data comprises to retrieve the circuit board manufacturing cost data from the manufacturing cost database via a publicly-accessible global network.

29. The article of claim 27, wherein the to retrieve the circuit board manufacturing capability data comprises to retrieve circuit board manufacturing capability data from the manufacturing capability database via a publicly-accessible global network.

* * * * *